United States Patent Office 3,386,941
Patented June 4, 1968

3,386,941
GLASS TINTING LACQUER COMPOSITIONS
John S. Kane, 218 W. Summit St.,
Somerville, N.J. 08876
No Drawing. Filed Aug. 12, 1965, Ser. No. 479,316
5 Claims. (Cl. 260—31.2)

ABSTRACT OF THE DISCLOSURE

A sprayable transparent tinted film-forming sun screen composition consisting of approximately 3–10 parts by weight of an acrylic resin selected from the group consisting of isobutyl poly methacrylate, n-butyl poly methacrylate, ethyl poly methacrylate and a 50/50 copolymer of n-butyl methacrylate/isobutyl methacrylate dissolved in approximately 90–97 parts by weight of a solvent medium comprising a blend of solvents selected from the group consisting of naphtha, isobutanol, n-butanol, n-propanol, xylene, methyl isobutyl ketone, butyl acetate, amyl acetate, cyclohexanone, ethylene glycol monoethyl ether, ethylene glycol monomethyl ether, ethylene glycol monomethyl ether acetate and ethylene glycol monoethyl ether acetate and approximately .35% solvent dye. The lacquers formulated in accordance with this invention are particularly suited for utilization as transparent sun-screen film-forming compositions for the aerosol application of optically distortion-free, tenaciously adherent films such as for the interior of automobile windshields and the like.

---

This invention relates to sprayable film-forming compositions. More particularly, this invention relates to sprayable film-forming compositions which are adapted for use as glass tinting lacquers.

Glass tinting lacquers which may for example be utilized to tint the interior of automobile windshields must be transparent, optically distortion-free, tenaciously adherent, reasonably hard and resistant to sunlight, sun heat and water. Furthermore, such lacquers must not get cloudy or hazy when exposed to water vapor such as when the relative humidity is high.

Heretofore, the lacquers utilized for such applications which generally exhibited sufficient hardness, adhesion, transparency and resistance to water were based on nitrocellulose. However, coatings produced from such nitrocellulose lacquers undergo considerable chemical and physical degradation under the influence of ultra-violet light such as is the case when a nitrocellulose lacquer is exposed to sunlight for a prolonged period of time. Such photochemical degradation of nitrocellulose lacquer manifests itself not only through severe discoloration of the film but also through the appearance of cracks, followed by peeling and/or blistering, loss of adhesion and general deterioration of other physical properties.

An object of this invention is to provide novel sprayable film-forming compositions which overcome the difficulties heretofore mentioned.

Another object of this invention is to provide novel sprayable film-forming compositions which are particularly adapted for use as glass tinting lacquers.

A further object of this invention is to provide novel sprayable film-forming compositions which dry to a transparent although tinted, optically distortion-free, tenaciously adhering, reasonably hard, sunlight, sun heat and water resistant lacquer which does not get cloudy or hazy when exposed to water vapor.

Still another object of this invention is to provide novel lacquer compositions which are sprayable from conventional areosol dispensing containers, which lacquers spread evenly, easily and uniformly, and which will flow-out to form an optically distortion-free transparent coating of uniform thickness over a large area, such as the interior surface of an automobile windshield, before the solvent base evaporates, yet will still dry within a relatively short time, such as about thirty minutes.

Still another object of this invention is to formulate novel sprayable substantially transparent lacquers which are compatible with conventional propellants utilized in conjunction with aerosol dispensing containers, which lacquer compositions accept tinting substances so that extremely thin coatings may be tinted sufficiently to enable their utilization as sun-screen coatings for automobile windows, windows in structural enclosures, and the like.

Further objects and aspects of the invention will become apparent in the following discussion.

These and other objects are attained by dissolving a transparent film-forming acrylic polymer or acrylic copolymer in a mineral-organic or organic solvent blend, adding suitable amounts of oil-soluble type dyestuffs, and pressurizing the tinted solution of acrylic resin with a mutually compatible aerosol propellant or blend or aerosol propellants in a suitable aerosol dispensing container.

One would assume that most clear, plastic lacquer resins would be usable for the desired purpose. However, after considerable experimentation it was discovered that among the host of clear, film-forming resins which are presently commercially available only a very few may be utilized to formulate tinting lacquers conforming to the parameters set forth supra. This is due to the fact that a very special relationship between the requiredx properties of the film base and its solvent blend has to be established in order to obtain the desired combination of properties of the lacquer composition as well as the dried tinted resinous coating. Exhaustive experiments have shown that such relationship apparently is not achievable with most of the available clear solvent resins. However, it was found that polymers of esters of methacrylic acid with n-butyl alcohol, isobutyl alcohol or ethyl alcohol, and a 50/50 copolymer of n-butyl alcohol methacrylic ester/isobutyl alcohol methacrylic ester can provide the desired resinous base when utilized in conjunction with novel solvent blends so as to satisfy the physical and chemical parameters required to carry out the objects of this invention.

While it is true that many acrylic resins may be utilized in lacquer compositions experimentation has shown that with the exception of the aforementioned four acrylics none of the other acrylics meet the physical and chemical parameters required for a satisfactory sprayable film-forming composition such as glass tinting lacquer. For example, contrary to all expectations, the methyl methacrylates in their all variations of molecular weights with their superior hardness, adhesion, transparency and their well established place in the lacquer industry are not satisfactory for utilization in tinting lacquers because their otherwise good solubilities exhibit limitations with respect to the particular solvent blends which are required for the estatblishment of the chemical and physical parameters required for glass tinting lacquer compositions.

While a lacquer composition of the character described should dry within a reasonably short time, within about thirty minutes, the drying should in no time during that period be accelerated to the point that loss of heat through solvent evaporation would cause water condensation from moist air to optically distort the film, even if the condensation should evaporate later and transparency be restored to the film. To achieve this result, viz: a uniform evaporation curve, the solvent blend must consist of solvent portions characterized by different evaporation rates and must not include any relatively low-boiling solvents. However, the consideration regarding evaporation rates alone is not sufficient for the formulation of a satisfactory solvent blend. Each of the higher boiling solvents comprising the blend must be characterized by the fact that they are not retained in any significant amount in the dried film and vice versa, the film base must have excellent solvent release properties without producing a clouding or distortion to occur in the dried film. As each solvent component evaporates the solvency properties of the remaining blend continuously changes. At no time during this drying process must the characteristics of the solvent blend change to a point where either the resin or the dyestuff becomes insoluble or approaches solution saturation. Neither should there be any sudden increase in viscosity caused by the changing nature of the solvent rather than by the increasing concentration of resin.

As indicated supra, the substantially water-insoluble, sprayable, film-forming materials which have been found satisfactory for the purpose of the present invention include the following acrylic polymers and copolymers: n-butyl poly methacrylate, isobutyl poly methacrylate, ethyl poly methacrylate, and a copolymer of n-butyl methacrylate and isobutyl methacrylate (50:50 by weight), any of which resins may be utilized in the proportion of approximately 3–10 parts by weight to 97–90 parts by weight of solvent blends hereinafter described.

The solvent blends for the above mentioned acrylic resins are preferably formulated from the following mineral and/or organic solvents: straight-run naphthas distilling in the range of approximately 240 degrees to 385 degrees F., isobutanol, n-butanol, n-propanol, xylene, methyl isobutyl ketone, butyl acetate, amyl acetate, cyclohexanone, ethylene glycol monoethyl ether, ethylene glycol monomethyl ether, ethylene glycol monomethyl ether acetate, ethylene glycol monoethyl ether acetate.

A number of dyestuffs, preferably of the oil-soluble type such as the "Acetosol" dyestuffs marketed by the Sandoz Chemical Works may be used to tint the clear acrylic lacquer formulations of the present invention. The Acetosol dyestuffs used in the specific examples set forth hereinafter are known in the Color Index supplement as Solvent Green No. 19, Solvent Brown No. 33, which identifies the dyes regardless of what trade name they might be sold under.

The sprayable film-forming lacquer compositions of this invention can be packaged in suitable spray valve-equipped aerosol dispensing cans using the customary propellants, such as those best known under the tradenames of Freon 11 (Du Pont), Freon 12 (Du Pont), Geon 11 (Allied Chemicals), Geon 12 (Allied Chemicals). It is possible to pack as little as 25% or as much as 70% of the lacquer composition with from 75% to 30% propellant which may, for example, comprise a blend of Freon 11 and 12 in the proportions of 20%–50% Freon 12 with 45%–80% Freon 11 depending on the desired pressures, etc. The aerosol containers are generally charged with propellant to an absolute pressure of approximately 45–50 p.s.i. Other compressed gases such as nitrogen, carbon dioxide, nitrogen monoxide and the like may also be used as propellants in conjunction with the lacquer compositions of the present invention.

The following specific examples are given to illustrate the reduction to practice of invention. Parts mentioned are generally parts by weight (p.b.w.) unless where indicated (p.p.v.) parts per volume.

Example I.—Transparent glass tinting lacquer 7 p.b.w. isobutyl poly methacrylate (Lucite 2045 Du Pont) is dissolved in 93 p.b.w. solvent blend comprising:

| | P.p.v |
|---|---|
| Naphtha Sovasol No. 4 (Socony Mobile Oil Co.) | 18 |
| Naphtha Sovasol No. 5 (Socony Mobile Oil Co.) | 20 |
| Isobutanol | 20 |
| n-Butanol | 70 |
| n-Propanol | 10 |
| Xylene | 15 |

The clear acrylic lacquer is then tinted by the adding on the basis of weight:

| | Percent |
|---|---|
| Acetosol dyestuff—Solvent Green No. 19 | 0.3 |
| Acetosol dyestuff—Solvent Brown No. 33 | 0.03 |

The resulting tinted transparent lacquer is preferably packaged by charging a suitable aerosol spray dispenser can with approximately, on the basis of weight:

| | Percent |
|---|---|
| Transparent tinted lacquer | 40 |
| Trichlorofluoromethane | 30 |
| Dichlorodifluoromethane | 30 | to an absolute pressure of approximately 45 to 50 p.s.i.

Alternatively the composition may be aerosol packaged by charging a suitable aerosol can with approximately, on the basis of weight:

25–70% tinted transparent lacquer
75–30% propellant comprising:
    45–80% trichlorofluoromethane
    55–20% dichlorodifluoromethane or comparable amounts of other propellants such as nitrogen, carbon dioxide, nitrogen monoxide, etc.

Example II.—Transparent glass tinting lacquer

The formulation of Example I was repeated with the exception that 7 p.b.w. of n-butyl poly methacrylate was substituted for the isobutyl methacrylate.

Example III.—Transparent glass tinting lacquer 7 p.b.w. copolymer n-butyl methacrylate and isobutyl methacrylate (50:50) is dissolved in 93 p.b.w. solvent blend comprising:

| | P.p.v |
|---|---|
| Straight-run naphtha Dist range 242–318° F. (Savasol #4) | 18 |
| Straight-run naphtha Dist range 304–385° F. (Savasol #5) | 20 |
| Isobutanol | 20 |
| n-Butanol | 70 |
| n-Propanol | 10 |
| Xylene | 15 |

The above transparent lacquer composition is tinted by adding:

| | Percent |
|---|---|
| Acetosol dyestuff (Sandoz Chem. Works) Solvent Green #19 | 0.3 |
| Acetosol dyestuff (Sandoz Chem. Works) Solvent Brown #33 | 0.03 |

The tinted sprayable film-forming composition is preferably packaged in a suitable aerosol spray dispenser can by charging the following into the can on the basis of weight:

25–70% lacquer
75–30% propellant comprising:
    45–80% trichlorofluoromethane
    55–20% dichlorodifluoromethane Example IV 7 p.b.w. ethyl poly methacrylate is dissolved in 93 p.b.w. solvent blend comprising:

| | P.b.w. |
|---|---|
| Methyl isobutyl ketone | 10 |
| Butyl acetate | 7 |
| Amyl acetate | 10 |
| Cyclohexanone | 10 |
| Ethylene glycol monoethyl ether ("Cellosolve") | 30 |
| Ethylene glycol monomethyl ether (methyl "Cellosolve") | 15 |
| Ethylene glycol monomethyl ether acetate (methyl "Cellosolve" acetate) | 15 |
| Ethylene glycol monoethyl ether acetate ("Cellosolve" acetate) | 3 |

The above transparent lacquer composition is tinted by adding:

| | Percent |
|---|---|
| Acetosol dyestuff Green No. 19 | 0.3 |
| Acetosol dyestuff Solvent Brown No. 33 | 0.03 |

The tinted sprayable film-forming composition is preferably packaged in a suitable aerosol spray dispenser can be charging the following into the can on the basis of weight with:

| | Percent |
|---|---|
| Lacquer | 40 |
| Trichlorofluoromethane | 30 |
| Dichlorodifluoromethane | 30 |

Alternatively the charge may comprise:

25–70% lacquer
75–30% propellant, which may be:
    45–80% Freon 11 (Du Pont)
    55–20% Freon 12 (Du Pont) or + methylene chloride, nitrogen, carbon dioxide, nitrogen monoxide

Example V

The lacquer of Examples I–IV may be modified as required to give the lacquer the proper flow-out or leveling properties by varying the resin: solvent blend from 3–10 p.b.w. resin and 97–90 p.b.w. solvent blend.

The tinted transparent film-forming lacquer compositions of Examples I to V when applied from a suitable aerosol spray dispenser exhibit excellent leveling properties and dry to a transparent, sun-screen tinted, water and abrasion resistant film of an optically distortion-free nature. The lacquer compositions of the above examples are preferably utilized by spraying the composition onto a glass surface to be coated but may be applied in any suitable manner which provides a uniform coating, to a glass or similar surface which has been thoroughly cleaned with a suitable non-filming agent. The lacquer is applied starting from the top of the surface to be coated and quickly applying a wetting coat over the entire surface immediately followed by reapplication of a generous supply of lacquer, starting from the upper surface again, and permitting the lacquer to flow-out or level and wiping off any excess which may occur at the bottom of the surface being coated. As indicated in Example V the concentration of the acrylic resin dissolved in the solvent blend should be reduced from the proportion given in Examples from I to IV to approximately 5 p.p.w. more or less when coating extremely large surfaces so as to provide a lacquer composition of low viscosity which will flow-out more quickly and, therefore, level more uniformly over extremely large surfaces.

Accordingly, it will be seen that there has been provided novel sprayable tinted film-forming lacquer compositions which are particularly adapted for the tinting of the interior surfaces of automobile windshields and the like so as to provide a highly desirable, easily applied, relatively inexpensive, durable sun-screen.

Although specific embodiments have been described herein, it is not intended to limit the invention solely thereto, but to include all of the obvious variations and modifications within the spirit and scope of the appended claims.

What is claimed as new is as follows:

1. A sprayable transparent tinted film-forming composition for establishing an optically distortion-free sun screen on a transparent panel member which consists of approximately 99.65% by weight of a polymer-solvent system consisting of approximately 3–10 parts by weight of an acrylic resin selected from the group consisting of poly (isobutyl methacrylate), poly (n-butyl methacrylate), poly (ethyl methacrylate) and a 50:50 copolymer of n-butyl methacrylate/isobutyl methacrylate dissolved in approximately 90–97 parts by weight of a solvent medium consisting of a solvent blend selected from the group of solvent blends consisting of on the basis of volume 38 parts naphtha (distillation range approximately 240°–385° F.), 20 parts isobutanol, 70 parts n-butanol, 10 parts n-propanol, 15 parts xylene; and on the basis of weight 10 parts methyl isobutyl ketone, 7 parts butyl acetate, 10 parts amyl acetate, 10 parts cyclohexanone, 30 parts ethylene glycol monoethyl ether, 15 parts ethylene glycol monomethyl ether, 15 parts ethylene glycol monomethyl ether acetate and 3 parts ethylene glycol monoethyl ether acetate and approximately .35% by weight of solvent dye.

2. A sprayable transparent tinted film-forming composition for establishing an optically distortion-free sun screen on a transparent panel member which consists of approximately 99.65% by weight of a polymer-solvent system consisting of approximately: 7 parts by weight poly (isobutyl methacrylate); and 93 parts by weight of a solvent blend consisting of on the basis of volume 18 parts naphtha (distillation range 240–318° F.), 20 parts naphtha (distillation range 304–385° F.), 20 parts isobutanol, 70 parts n-butanol, 10 parts n-propanol and 15 parts xylene and approximately .35% by weight of solvent dye.

3. A sprayable transparent tinted film-forming composition for establishing an optically distortion-free sun screen on a transparent panel member which consists of approximately 99.65% by weight of a polymer-solvent system consisting of approximately: 7 parts by weight poly (n-butyl methacrylate); and 93 parts by weight of a solvent blend consisting of on the basis of volume 18 parts naphtha (distillation range 240–318° F.), 20 parts naphtha (distillation range 304–385° F.), 20 parts isobutanol, 70 parts n-butanol, 10 parts n-propanol and 15 parts xylene and approximtaely .35% by weight of solvent dye.

4. A sprayable transparent tinted film-forming composition for establishing an optically distortion-free sun screen on a transparent panel member which consists of approximately 99.65% by weight of a polymer-solvent system consisting of approximately: 7 parts by weight of a (50:50) copolymer of n-butyl methacrylate and isobutyl methacrylate; and 93 parts by weight of a solvent blend consisting of on the basis of volume 18 parts naphtha (distillation range 240–318° F.), 20 parts naphtha (distillation range 304–385° F.), 20 parts isobutanol, 70 parts n-butanol, 10 parts n-propanol and 15 parts xylene and approximately .35% by weight of solvent dye.

5. A sprayable transparent tinted film-forming composition for establishing an optically distortion-free sun screen on a transparent panel member which consists of approximately 99.65% by weight of a polymer-solvent system consisting of approximately: 7 parts by weight poly (ethyl methacrylate); and 93 parts by weight of a solvent blend consisting of, on the basis of weight 10 parts methyl isobutyl ketone, 7 parts butyl acetate, 10 parts amyl acetate, 10 parts cyclohexanone, 30 parts ethylene glycol monoethyl ether, 15 parts ethylene glycol monomethyl ether, 15 parts ethylene glycol monoethyl ether acetate and 3 parts ethylene glycol monoethylene ether acetate and approximately .35% by weight of solvent dye.

References Cited

UNITED STATES PATENTS

| 2,940,950 | 6/1960 | Gusman | 260—33.4 |
| 3,060,148 | 10/1962 | Evans | 260—33.4 |

OTHER REFERENCES

Aerosols: Science and Technology; Shepherd, Editor; Interscience Publishers, Inc., New York, N.Y. (1961) pp. 220, 496–506 relied upon TP244.A3S4.

MORRIS LIEBMAN, *Primary Examiner.*

R. BARON, *Assistant Examiner.*